April 27, 1926.
C. E. DODSON
1,582,252
STORAGE BATTERY PLATE MOLDING MACHINE
Filed Jan. 2, 1925 2 Sheets-Sheet 1
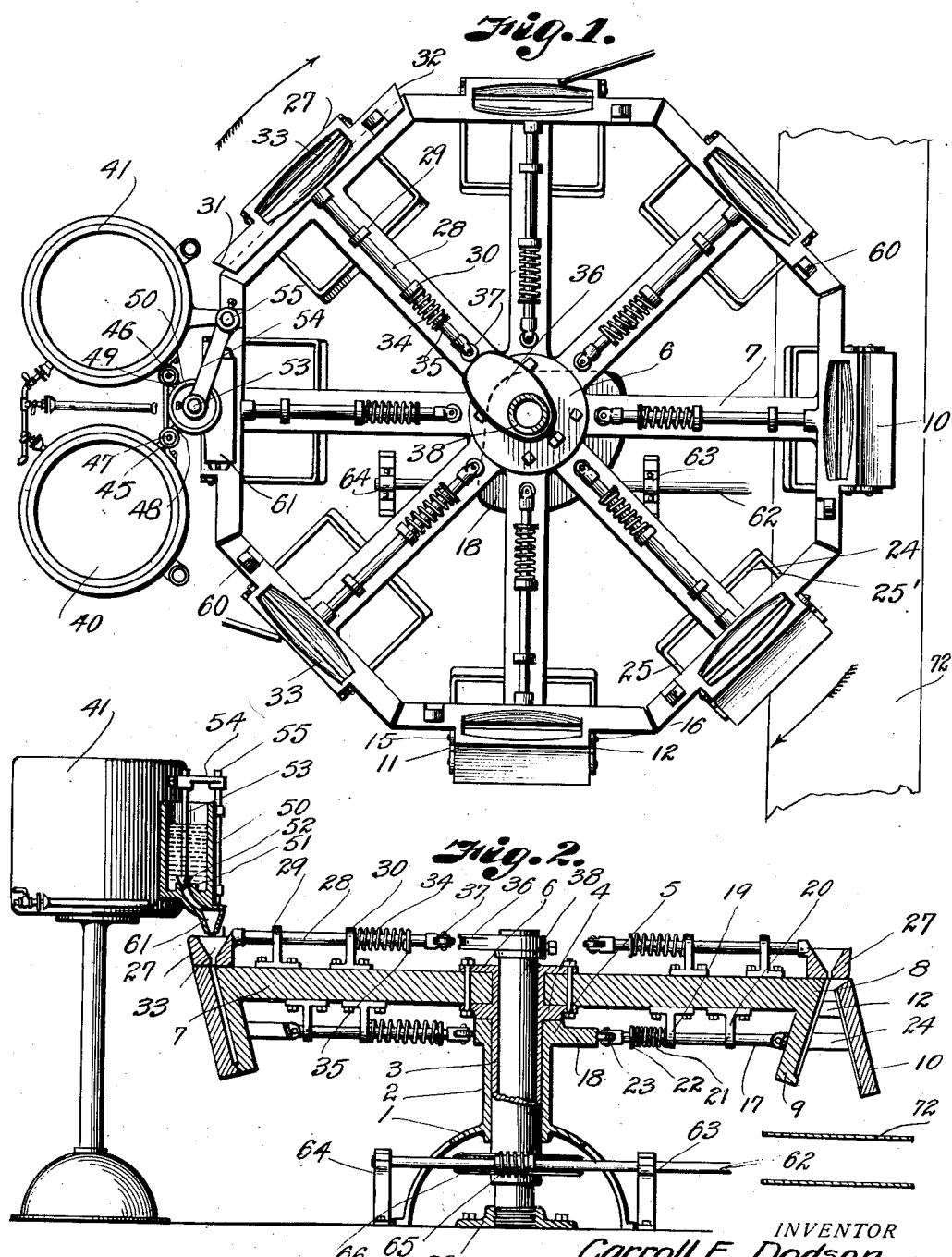

April 27, 1926.
C. E. DODSON
1,582,252
STORAGE BATTERY PLATE MOLDING MACHINE
Filed Jan. 2, 1925   2 Sheets-Sheet 2
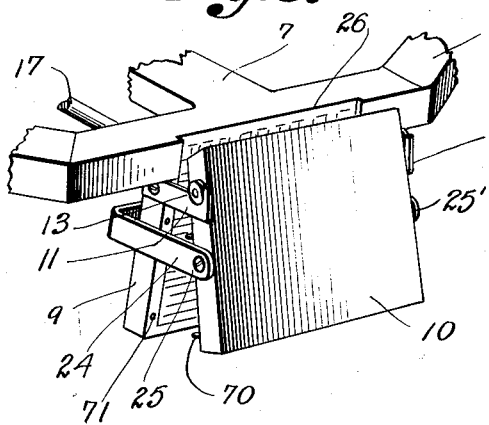
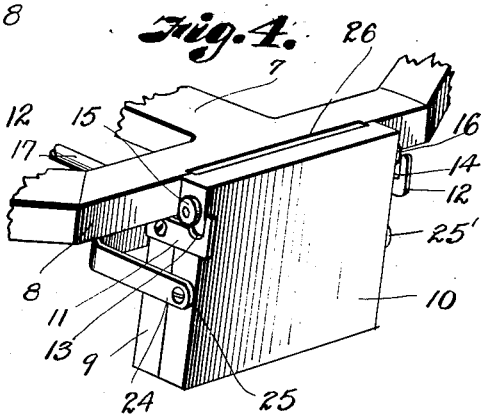
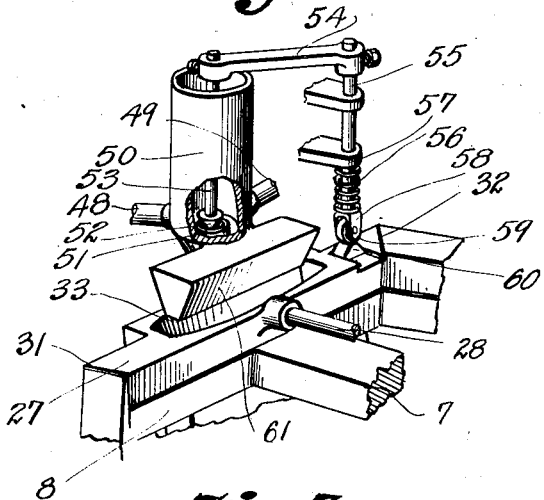
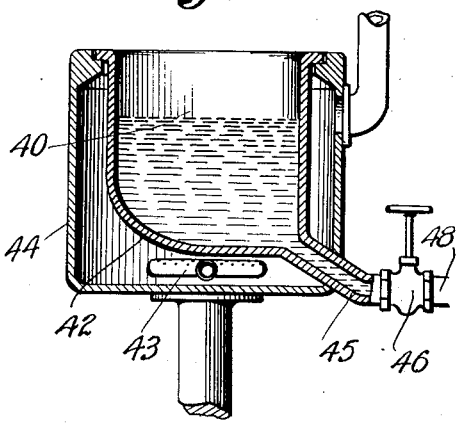
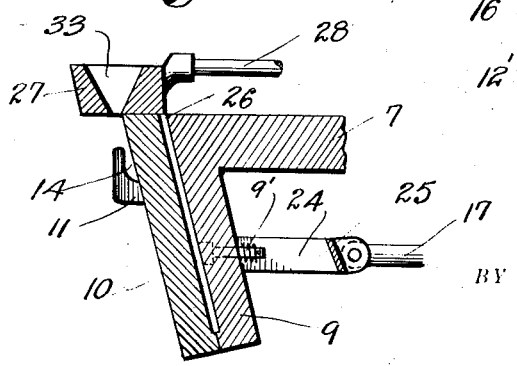
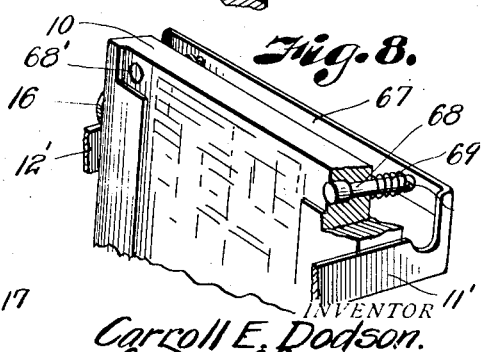
INVENTOR
Carroll E. Dodson.
BY
ATTORNEY Patented Apr. 27, 1926.

1,582,252

UNITED STATES PATENT OFFICE.

CARROLL E. DODSON, OF KANSAS CITY, MISSOURI.

STORAGE-BATTERY-PLATE-MOLDING MACHINE.

Application filed January 2, 1925. Serial No. 259.

*To all whom it may concern:*

Be it known that I, CARROLL E. DODSON, a citizen of the United States, residing at Kansas City, in the county of Jackson and State of Missouri, have invented certain new and useful Improvements in Storage-Battery-Plate-Molding Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to automatic molding machines and particularly to a turret type of molding machine especially adapted for forming Planté or grid type of storage battery plates.

Associated with the turret, which carries the molds, is one or more melting pots delivering molten metal into a cupola or discharging pot provided with a valve outlet controlled by the turret so that as the molds align with the discharge nozzle of the cupola, molten metal will be delivered into the molds to form plates, then as the turret rotates, actuating mechanism will operate the molds to permit the plates to drop to the floor. Means is also provided whereby the gate will cleave the excess material from the top of the plates so as to make all plates symmetrical and of uniform size and the invention consists in certain novel parts and combination of parts which will be specifically described hereinafter, reference being had to the accompanying drawings, in which—

Fig. 1 is a plan view of a molding machine constructed in accordance with my invention.

Fig. 2 is a vertical cross sectional view, the turret parts of the apparatus being shown in elevation.

Fig. 3 is a fragmentary perspective view of the turret showing one of the molds in extended position to permit the plate to drop.

Fig. 4 is a like view with the mold in contracted position.

Fig. 5 is a perspective view of the cupola and part of the current, part of the cupola being broken away to illustrate the construction.

Fig. 6 is a sectional view of one of the melting pots, slightly modified.

Fig. 7 is a fragmentary sectional view through the turret showing the mold and the gate in section, and Fig. 8 is a fragmentary perspective view of a slightly modified form of mold unit.

Referring now to the drawings by numerals of reference, 1 designates a base made hollow to provide a gear case and it supports a standard 2 within which is a tubular shaft 3 having a collar 4 which rests upon the upper end of the standard and which turns thereon. The collar 4 or the collar 5 on the standard may be provided with anti-friction bearings if desired, although these are not shown in the drawings. The tubular shaft 3 extends beyond the collar 4 and it is provided with a peripheral flange 6 parallel with the collar 4 to provide a circumferential recess to receive the spider arms 7 radially disposed about the axis of the hollow shaft 3 and connected at their outer ends by a rim 8 so as to complete the turret which carries the molds. The molds are best shown in Figs. 3, 4 and 7. Each mold is illustrated as consisting of two members 9 and 10. The member 9 rigidly depends from the rim of the turret and it has an inward declination for the purpose to be presently explained. The other member 10 is a movable member which is supported by the two outwardly disposed bracket arms 11 and 12, having notches 13 and 14 to receive the trunnions 15 and 16 on the respective edges of the movable member 10 so that a hinge is formed to permit the movable member 10 to swing outwardly or inwardly as occasion may demand. The movable member of each mold is actuated by a longitudinal reciprocatory rod 17 actuated by the cam 18 on the collar 5. The rod 17 in each instance is supported by the brackets 19 and 20 through which it projects and each rod is urged toward the axis of the machine by an expansion spring 21, one end of which bears against the bracket 19 and the other end against the collars 22 fixed on the rod 17. The inner end of each rod is provided with a roller 23 which bears against the cam 18 for the purpose of reducing friction. The outer end of each rod 17 is pivoted to a yoke 24, the side arms 25 and 25′ of which are in turn pivoted to the member 10, therefore, as the rod is moved outwardly by the cam 18 against the action of the spring 21 the member 10 is swung about the axes of its trunnions to assume the position shown in Fig. 3 and during this action the yoke bodily moves the member 10 away from the member 9 to separate them before the trunnions drop into the notches 13 and 14, thus the space utilized by the matrix within the member 9 and 10 is enlarged sufficiently to insure the deposition of the finished plate upon the floor. The operations of the rods are timed to move after the metal has been flowed into the matrix and by referring to Fig. 4 it will be observed that in the contracted position of the molds the members 9 and 10 fit closely together and that the periphery of the rim in line with the rigid member 9 is cut away slightly as at 26 so that when the members 9 and 10 are together there will be a slot to admit the metal into the matrix of the molds. It will be clearly understood, of course, that the matrix is formed so that the finished plate will have the proper pockets for the active material. In other words the matrix is so constituted that it will make the proper type of grid.

The metal is delivered to the slot or opening 26 from a distributing trough or bar generically designated 27. It constitutes a gate for the molds and it consists of an elongated bar slidable transversely of the rim of the turret and actuated by a radially disposed push rod 28 guided in the guides or brackets 29 and 30 on the radial arm 7. The ends of the gate or trough are mitered as at 31 and 32 so that the ends of the bars for two molds will constitute stops for one bar between them.

Since the edge of the turret is made up of a plurality of straight sides, end to end, each side corresponding to an arm 7 and each carries a mold. Each trough 27 is provided with a flared slot 33 merging into a constricted opening at its bottom which may normally lie in register with slot 26 but since each trough or gate 27 may move across the mold to bring the opening 33 out of register with the matrix, as shown in Fig. 7, it will be apparent that the excess material of the plate will be removed during the reciprocatory movement of the push rod 28. The amplitude of movement of the push rod and consequently the member 37 will be such that the lower edge of the opening 33 will register beyond the periphery of the turret and beyond the outer face of the member 10 so that the excess material may drop to the floor, and to thereby clear the gate or trough for a new charge the next time the mold is aligned with the cupola. The normal tendency of the member 27 is to align with the slot 26 and this is accomplished by an expansion spring 34 for each push rod. The expension spring is coiled about the push rod, one end bearing against the bracket 29 and the other against the collar 35 fastened against the push rod, therefore, the push rod will be moved outwardly only when the cam 36 contacts with one of the rollers 37 on the end of one of the push rods 28. The cam is a fixed cam on the end of the post 38 within the tubular shaft 3. The post 38 is mounted in a base plate 39 which may be fastened to the floor in any suitable manner.

As heretofore explained, the metal is delivered from the melting pots through a cupola into trough blocks or gates, one or more melting pots may be employed. I have shown two, designated 40 and 41. One is illustrated in Fig. 6 as comprising a receptacle 42 with a burner 43 under it. The receptacle 42 being in a casing 44 but spaced from the wall thereof so the flame from the burner 43 may sufficiently heat the metal to a state of fluidity. Each melting pot is provided with an outlet 45, each outlet having a valve, there being two valves 46 and 47 shown for the respective melting pots. These valves control the effective port areas of the pipes 48 and 49 which connect the melting pots with the cupola 50. The cupola 50 is provided with valve seat 51 in its bottom to receive a valve 52 on the end of the stem 53 projecting through the top of the cupola casing and provided with an arm 54 on a push rod 55 normally urged downwardly by the coil spring 56 one end of which bears against the rigid bracket arm 57 and the other end against the caster head bracket 58 which carries the wheel 59. The push rod is lifted by a push rod actuator shown as a lug 60. There is one for each gate or trough 27, therefore, when the trough or gate align with the end cupola the roller 59 will ride over the lug 60 and unseat the valve and allow the charge of molten metal to be fed into the gate or trough to fill the matrix and in order to obtain an equal distribution of the material into the matrix, or more accurately into the trough bar, I provide an elongated nozzle 61.

It is desired of course to rotate the turret at an even uniform speed so I have shown a drive shaft 62 mounted in bearings 63 and 64. The drive shaft can receive its motion from any suitable source and it carries a worm 65 meshing with a worm gear 66 on the hollow shaft 3.

When the parts are assembled and the drive shaft 62 is turning to turn the worm 65 and through it the worm gear 66, the hollow shaft 3 will be rotated. As it rotates it will turn the turret bringing the successive molds into line with the discharge nozzle 61 of the cupola and since the lug or projection 60 will operate the valve in the cupola it will follow that a charge of molten metal will be delivered into the aligned molds. Since the fixed cam 36 has its high lobe at an angle of about 45° in rear of the point where the metal is received into the mold it will be apparent that as the mold moves away from the cupola the push rods will ride on the high lobe of the cam 36 causing the gates or trough blocks to be actuated transversely of the mold to clear away the excess material. The springs 34 will retain their normal positions and during this time the mold is not disturbed. The molten plate remains in the mold until the mold has traveled about 180° or slightly less perhaps, then the push rods 17 ride on the high lobe of the fixed cam 18 of the standard 2 so that the molds are expanded. After traveling about 180° in a circle the expansion takes place by first separating the members bodily, that is by moving the member 10 away from the member 9 and swing it outwardly. This makes an appreciable gap between the two members 9 and 10 so that the plate will drop to the floor. Just before the movable members reach the cupola the rollers 19 ride off the high lobe of the cam so that the springs 21 can bring the mold members together as shown in Fig. 4, this preparatory to bringing the mold members to register with the cupola. It will be apparent that the operation is continuous and uniform.

The burner 43 may be of any suitable construction and it can be properly controlled as will be clearly understood.

In the modified form shown in Figure 8, notched bracket arms 11' and 12', similar to arms 11 and 12 are employed. These arms are connected by the bar 67. The bar 67 carries upwardly projecting headed pins 68 and 68' which extend through the movable member 10 of the mold, and on the pins are expansion springs located between the bar 67 and the movable member 10 so that when the movable member is moved away from the fixed member, the movable member will be cushioned and will be guided during its movements.

What I claim and desire by Letters-Patent is:—

1. In a storage battery plate molding machine, a source of molten metal supply, a nozzle for delivering the molten metal from the source of supply, an intermittent operating means for communicating the nozzle with the source of supply, a plurality of molds, means for advancing the molds past the nozzle whereby molten metal may be delivered from the nozzle to the molds and transversely movable slotted bars over the molds normally in line with the molds but having movement across the top of the molds to break away the gates formed by the molten metal entering the molds.

2. In a storage battery plate molding machine, a turret, means for rotating the turret, a plurality of molds carried by the turret, a plurality of slotted bars carried by the turret movable across the entrance to the molds, push rods carried by the bars, a fixed cam over which the push rods move to actuate the bars, a spring for returning the bars to normal position and means for delivering molten metal to the slotted bars when they align with the entrance to the molds.

3. In a storage battery plate molding machine, a turret, means for rotating the turret, a plurality of molds carried by the turret, a plurality of slotted bars carried by the turret movable across the entrance to the molds, push rods carried by the bars, a fixed cam over which the push rods move to actuate the bars, a spring for returning the bars to normal position, means for delivering molten metal to the molds, and cam actuating means for opening the molds after the bars have returned to normal position, the cam actuating means being effective in permitting the molten plates to dislodge by gravity from the molds.

4. In a molding machine, a source of molten metal supply, a valve for delivering molten metal from the source of supply, a plurality of opening and closing sectional molds arranged in circular series movable past the nozzle to receive molten metal therefrom, a fixed cam, a plurality of radial cam-actuated, spring-retracted rods having movement to open and close the molds, and yokes carried by the rods connected to the movable mold sections.

5. In a molding machine, a source of molten metal supply, a valve for delivering molten metal from the source of supply, a plurality of opening and closing sectional molds arranged in circular series movable past the nozzle to receive molten metal therefrom, a fixed cam, a plurality of radial cam-actuated, spring-retracted rods having movement to open and close the molds, yokes carried by the rods connected to the movable mold sections, and a bar movable over each split mold to break away the gates formed by the molten metal entering the molds.

6. In a molding machine, a source of molten metal supply comprising a pot with a discharge opening in its bottom, a vertically movable valve for controlling the opening, a stem on the valve, a transverse arm on the stem, a depending spring-pressed rod on the arm, a turret having cams upon which the lower ends of the rods ride, and molds on the turret movable past the discharge opening.

7. A molding machine comprising a turret, sectional molds carried by the turret, each mold comprising a fixed member and a movable member, notched bracket arms on each fixed member, trunnions on each movable member, and radial actuators on the turret effective to move the movable members away from the fixed members to cause the trunnions to be received in the notches and effective to move the movable members against the fixed members and to simultaneously move the trunnions out of the notches.

8. A molding machine comprising a turret, sectional molds carried by the turret, each mold comprising a fixed member and a movable member, notched bracket arms on each fixed member, trunnions on each movable member, and radial actuators on the turret effective to move the movable members away from the fixed members to cause the trunnions to be received in the notches and effective to move the movable members against the fixed members and to simultaneously move the trunnions out of the notches, each actuator comprising a spring-retracted, cam-actuated rod having a yoke-shaped end straddling the fixed member and connected to a movable member.

9. A molding machine comprising a turret, molds carried by the turret, means for delivering molten metal to the molds, and channeled bars movable toward and away from the inlets to the molds, the channels being adapted to align with the inlets to the molds when molten metal is supplied by the delivery means.

In testimony whereof I affix my signature.

CARROLL E. DODSON.